Sept. 21, 1926.

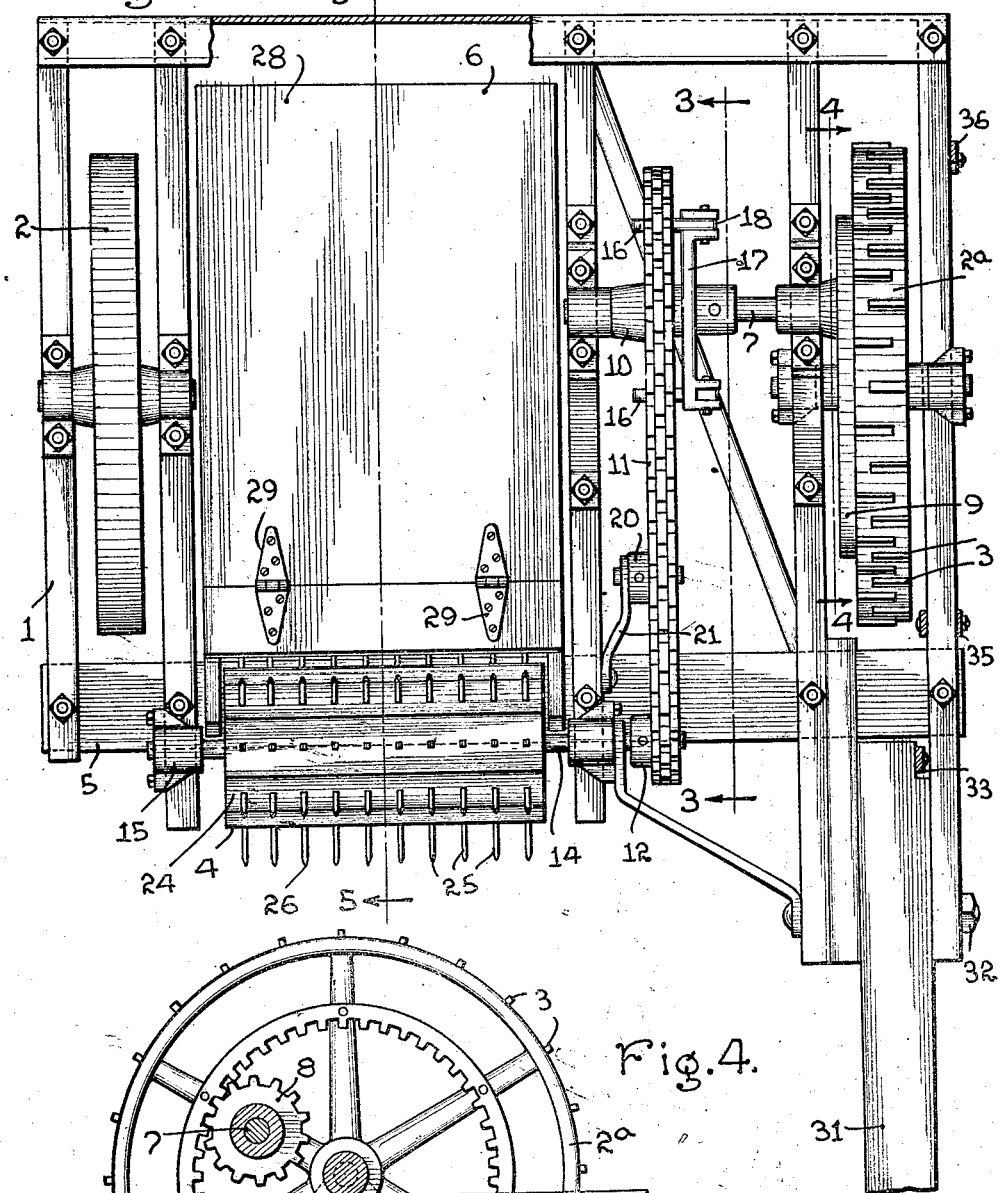

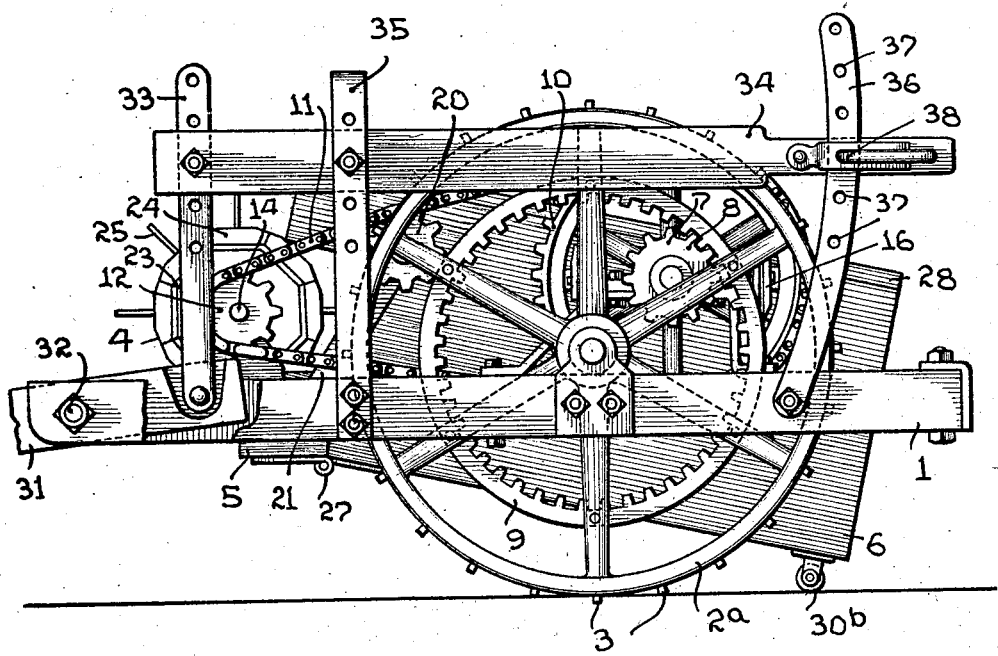
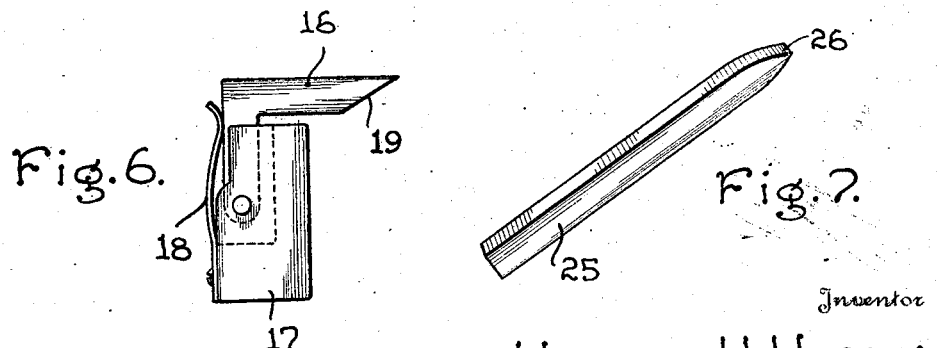

H. H. HARDIN

SEED HARVESTER

Filed Nov. 4, 1924

Inventor

HARVEY H. HARDIN

By *[signature]*

Attorney

Patented Sept. 21, 1926.

1,600,877

UNITED STATES PATENT OFFICE.

HARVEY H. HARDIN, OF MAITLAND, MISSOURI.

SEED HARVESTER.

Application filed November 4, 1924. Serial No. 747,792.

The object of the invention is to provide a machine for effectively gathering the seed of grass, legumes, such as blue grass, timothy, white clover and other varieties of grass and legumes, by means of a toothed stripping cylinder of relatively small diameter and rotating at a high speed for disposition in close proximity to the ground in order to gather short seed; to provide the cylinder with a stripping tooth capable of the most effective operation; to provide a frame of light construction and equipped with a thin grain board at the front and directly below the stripping cylinder; to provide means for adjusting the frame to secure the most effective position of the grain board; and to provide a seed receptacle disposed at an inclination away from the stripping cylinder to preclude any discharge of the gathered seed from the receptacle, irrespective of the downward adjustment or forward inclination of the frame.

With these objects in view, the invention consists in a construction and combination of parts of which a preferred embodiment is illustrated in the accompanying drawings, wherein:

Figure 1 is a top plan view of a machine constructed in accordance with the invention.

Figure 2 is a side elevational view.

Figure 4 is a section on the plane indicated by the line 4—4 of Figure 1.

Figure 6 is a detail elevational view illustrating one of the pawls constituting an element of the clutch.

Figure 7 is a detail perspective view illustrating one of the cylinder stripping teeth.

Figure 3:
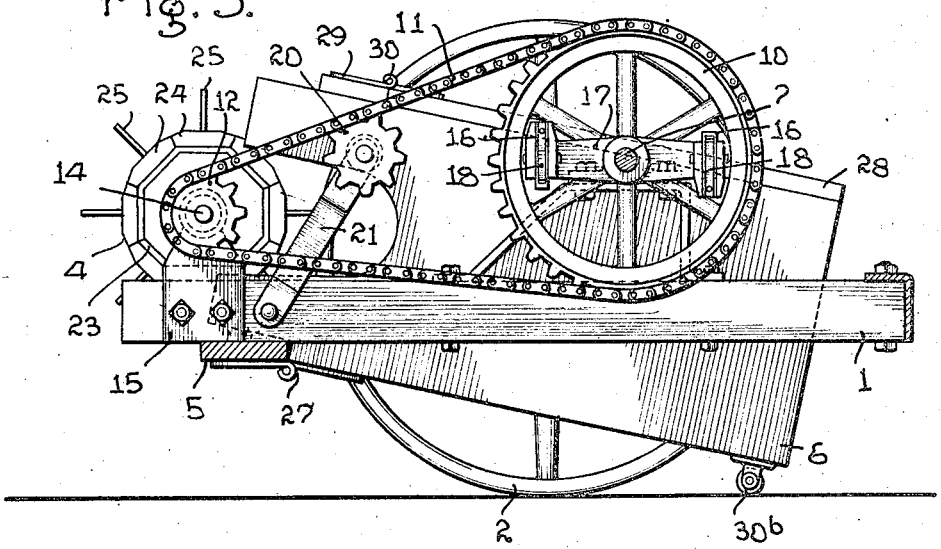
Figure 3 is a section on the plane indicated by the line 3—3 of Figure 1.
Figure 5:
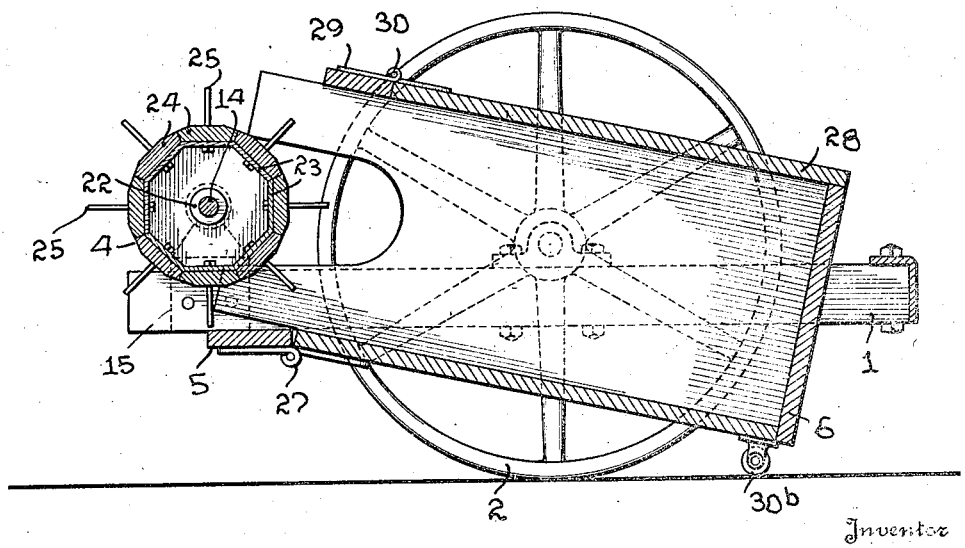
Figure 5 is a section on the plane indicated by the line 5—5 of Figure 1.

The frame 1 on which all of the apparatus is mounted is supported on the wheels 2 and $2^a$ disposed at the longitudinal center of the frame to balance the latter as nearly as possible, the wheel $2^a$ being provided with peripheral lugs 3 and constituting the driving mechanism for the stripping cylinder 4 which is disposed directly above the grass board 5 transversely spanning the frame. As the stripping cylinder rotates, the grass is thrown down over the grass board 5 and the seed which is stripped from the grass is deposited in the receptacle 6 carried by the frame in the rear of the grass board. The grass board constitutes the forward transverse frame member and being relatively thin may be brought very close to the ground upon adjustment of the frame and, therefore, the stripping cylinder may be positioned close to the ground.

That motion may be transmitted from the wheel $2^a$ to the stripping cylinder, there is provided a shaft 7 rotatably mounted in the frame, the shaft carrying a pinion 8 meshing with an annular or ring gear 9 carried by the traction wheel $2^a$. Thus, as the apparatus as a whole moves, the direction of rotation of the shaft 7 is the same as the direction of rotation of the ground wheel. Floating on the shaft 7 is a sprocket wheel 10 transversed by a chain 11 which is trained over the sprocket 12 mounted on the shaft 14 of the stripping cylinder, this shaft being journaled in bearings 15 on the frame.

The sprocket wheel 10 is of the spoked variety and motion from the shaft 7 is communicated to it by angular pawls 16 pivotally mounted on the extremities of a crosshead 17 fixed to the shaft 7. The pawls 16 are yieldingly impelled by springs 18 into obstructing relation with the spokes of the sprocket wheel 10 and thus when the shaft 7 rotates, the pawls engage the spokes of the sprocket wheel and the motion of the shaft is communicated to the sprocket wheel with a resultant rotation of the stripping cylinder.

In order that an excessive strain may not be exerted upon the driving connection, as when the machine is stopped, the pawls 16 are beveled on the rear edges, as at 19, so that the sprocket wheel, due to its own inertia and the inertia of the cylinder, may rotate forwardly, the spokes of the sprocket wheel at such times engaging the beveled edges or noses 19 and laterally shifting the pawls to permit rotation of the sprocket wheel and cylinder until they finally come to rest for lack of driving power. To provide for keeping the proper tension on the chain 11, the latter is engaged by an idler sprocket 20 carried by an adjustable arm 21.

The stripping cylinder because of its relatively high rotation is intended to be constructed as light as possible and to this end comprises a hub 22 carrying the polygonal spiders 23 which are spanned by preferably wooden plates 24 in which the teeth 25 are mounted, the teeth being preferably of the contour indicated in Figure 7 to provide the cutting edges 26 by means of which the seed is readily removed from the grass.

In order that the seed receptacle 6 may incline rearwardly from the grass board so that as the latter is lowered the seed may not be discharged from the front end and thus lost, it is hingedly connected with the grain board, as indicated at 27, and is accessible for the removal of the seed through the top which is closed by a hingedly mounted cover 28 hinged, as at 29, to a transverse bar 30. The rear end of the receptacle is supported by the rollers 30ᵇ.

The draft for moving the machine is applied through a tongue 31 pivotally connected with the frame, as at 32, the portion extending rearwardly of the pivotal connection being connected adjacent its extremity with a link 33. An adjusting lever 34 for effecting the desired angular inclination of the frame is pivotally connected at its forward end with the link and rockably mounted on a standard 35, the rear extremity traversing an arcuate bar 36 provided with a plurality of holes 37 selectively engageable by a spring actuated latch pin 38 carried by the adjusting lever 34.

Obviously, the rocking movement imparted to the lever 34 will change the relative angular positions of the draft tongue 31 and the frame 1 and since, in operation, the draft tongue will be normally horizontal, the frame will be inclined upwardly or downwardly depending upon the adjustment of the lever 34. By this means, the stripping cylinder and with it the grass board may be adjusted toward or away from the ground as desired, and the seed receptacle, being hingedly connected with the grass board, will always be in a downward inclination rearwardly of the latter, irrespective of the adjustment of the frame.

The cross-head 17 and its pawls serve as an over-running clutch for communicating the motion from the traction wheel to the stripping cylinder and permitting rotation of the latter after the stopping of the machine until the stripping cylinder stops of its own inertia. Thus, a relatively high speed may be obtained with the stripping cylinder without any sudden shock to the driving connection upon stopping of the relatively slow moving frame.

The invention having been described, what is claimed as new and useful is:

1. A seed harvester comprising a frame, ground wheels supporting said frame, the frame being fulcrumed for tilting movement, a seed receptacle operatively and pivotally mounted on the frame and inclining downwardly and rearwardly and having ground rollers supporting the rear end of the receptacle, a stripping cylinder disposed adjacent the forward open end of the receptacle, a tongue pivotally connected to the frame and adapted to have its forward end supported from the harness on a draft animal, a supporting standard rising from the frame, a lever fulcrumed on the standard and having a link at one end in turn operatively connected to the tongue, and means cooperating with the other end of the lever for holding it in different adjusted positions, the lever being operable to tilt the tongue and thereby tilt the frame forwardly and downwardly and hence cause the forward end of the seed receptacle to lower.

2. A seed harvester comprising a frame with supporting ground wheels on which the frame is pivotally supported, a grass board across the forward end of the frame, a seed receptacle hingedly connected to the grass board and extending downwardly and rearwardly and having ground rollers to support the rear end of the receptacle, a stripping cylinder adjacent the entrance to the receptacle, a tongue pivotally connected to the frame and in turn adapted to be supported from the harness of a draft animal, a link pivotally connected to the rear end of the tongue rearwardly of the pivot of the tongue, a supporting standard on the frame, a lever fulcrumed on the standard and in turn operatively connected to the link, whereby upon tilting the lever the tongue may be tilted angularly and hence tilt the frame in either direction, whereby the grass board may be adjusted relative to the plants, and means for holding the lever in different adjusted positions.

3. In a seed harvester, the combination with a frame, supporting ground wheels on which the frame is pivotally mounted, a seed receptacle pivotally connected to the frame and located within the same and having ground rollers to support the rear lower end of the receptacle, a stripping cylinder adjacent the entrance end of the receptacle, a tongue pivotally connected to the frame and comprising a rear short end and a long forward end, the latter being adapted to be supported by the harness of a draft animal, a link operatively connected to the short arm of the tongue, a standard on the frame, a lever pivotally and adjustably supported on the standard and having short and long arms, the former being adjustably pivoted to the link, whereby upon tilting the lever upwardly and downwardly, the tongue correspondingly tilts, thereby changing the angle of the frame as well as raising and lowering the forward end of the receptacle, and means for holding the rear end of the lever in different adjusted positions.

In testimony whereof he affixes his signature.

HARVEY H. HARDIN.